United States Patent
Millard

Patent Number: 6,122,738
Date of Patent: Sep. 19, 2000

[54] COMPUTER FILE INTEGRITY VERIFICATION

[75] Inventor: John Millard, Los Angeles, Calif.

[73] Assignee: Symantec Corporation, Cupertino, Calif.

[21] Appl. No.: 09/010,939

[22] Filed: Jan. 22, 1998

[51] Int. Cl.[7] ........................................ G06F 9/00
[52] U.S. Cl. .................. 713/187; 713/176; 713/189; 380/25; 714/758
[58] Field of Search ........................ 714/758; 713/200, 713/187, 201, 176, 202, 189; 709/229; 364/200; 380/3, 4, 25, 49, 51

[56] References Cited

U.S. PATENT DOCUMENTS

| | | | |
|---|---|---|---|
| 4,766,537 | 8/1988 | Zolnowsky | 711/163 |
| 4,888,798 | 12/1989 | Earnest | 705/54 |
| 5,050,212 | 9/1991 | Dyson | 380/25 |
| 5,103,476 | 4/1992 | Waite et al. | 705/459 |
| 5,182,770 | 1/1993 | Medveczky et al. | 705/456 |
| 5,432,851 | 7/1995 | Scheidt et al. | 713/184 |
| 5,530,757 | 6/1996 | Krawczyk | 380/23 |
| 5,548,532 | 8/1996 | Menand et al. | 370/477 |
| 5,606,609 | 2/1997 | Houser et al. | 380/4 |
| 5,625,693 | 4/1997 | Rohatgi et al. | 713/187 |
| 5,661,848 | 8/1997 | Bonke et al. | 711/112 |
| 5,799,088 | 8/1998 | Raike | 380/30 |
| 5,802,080 | 9/1998 | Westby | 714/807 |
| 5,832,207 | 11/1998 | Little et al. | 713/200 |
| 5,854,759 | 12/1998 | Kaliski, Jr. et al. | 7108/492 |
| 6,000,032 | 12/1999 | Millard | 713/201 |
| 6,014,767 | 1/2000 | Glaise | 714/776 |
| 6,048,090 | 4/2000 | Zook | 371/37.4 |

FOREIGN PATENT DOCUMENTS

| | | | |
|---|---|---|---|
| WO 93/25024 | 12/1993 | WIPO | H04L 9/00 |
| WO 95/15522 | 6/1995 | WIPO | G06F 7/02 |

OTHER PUBLICATIONS

McNamara, John E., *Technical Aspects of Data Communication*, 2nd Ed. 1982, Digital Equipment Corporation, U.S.A., pp. 110–122.

Ore, Oystein, *Number Theory and Its History*, 1976, Gudrun Ore, U.S.A., pp. 124–129.

Schneier, Bruce, *Applied Cryprography*, 2nd Ed. 1996, Bruce Schneier, U.S.A., pp. 436–441.

Nair, et al., A Symbol Based Algorithm for Hardware Implementation of Cyclic Redundancy Check, IEEE, 1997.

*Primary Examiner*—Albert De Cady
*Assistant Examiner*—Guy Lamarre
*Attorney, Agent, or Firm*—Fenwick & West LLP

[57] ABSTRACT

System and method for verifying the integrity of contents within a computer file. A security value S is stored within the file. A verification function f is applied against the entire contents of the file including S, where f is a function of S. Results R of the applying step are compared against a preselected value r, where r is not stored within the file. When R equals r, a determination is made that the file has not been modified. f is typically a distributive invertible function such as the Cyclic Redundancy Check (CRC) function known as modulo p, where p is a prime number and is one bit greater than the length of S. Typically, the value of r is zero. Before executing the verification function f, a check generating program is first executed. This check generating program is executed by a computer that is remote from the file, further enhancing the security of the system.

11 Claims, 3 Drawing Sheets

COMPUTER FILE INTEGRITY VERIFICATION

RELATED APPLICATION

A related patent application is U.S. patent application Ser. No. 08/893,934 filed Jul. 15, 1997 now U.S. Pat. No. 6,000,032 and entitled "Secure Access to Software Modules", which patent application has the same inventor and assignee as the present application and is hereby incorporated by reference in its entirety into the present patent application.

TECHNICAL FIELD

This invention pertains to the field of verifying the integrity of the contents of computer files.

BACKGROUND ART

FIG. 1 illustrates a generic prior art system for verifying the integrity of computer data 1. File 5 is associated with a digital computer 2, and contains data 1 and a security value S stored in location 7 within file 5. File 5 is accessible to a central processing unit (CPU) 3 of the computer 2. CPU 3 executes program instructions on behalf of the computer 2.

In a first embodiment of the prior art, CPU 3 applies a checksum function against data 1 within file 5, in which all the bytes of file 5, except for the security value S, are added together. This sum is then compared with the security value S. If these two values match, data 1 is deemed not to have been modified, maliciously or otherwise. In this checksum embodiment, the security value S could be stored in a location that is not part of file 5 but is accessible thereto. The problem with this method of file verification is that it is easy to rechecksum file 5 if file 5 has been changed for malicious purposes. For example, a hacker could rather easily maliciously change the contents of data 1, then recompute security value S to correspond with the changed data 1, thus lulling the user of the computer 2 into thinking that the contents of data 1 had not actually changed. This method of data verification can be easily and regrettably reversed engineered to show that the function being used by CPU 3 is a checksum function.

In a second embodiment of the prior art, CPU 3 uses a cyclic redundancy check (CRC) function against the data 1 within file 5. In this embodiment, a CRC of all the bytes in the file 5, not including security value S, is computed by CPU 3 and stored as security value S. Again, S is easy to recompute if the hacker knows that a CRC is being used, and this method of data verification can be relatively easily reverse engineered to show that a CRC is in fact being used.

In a third embodiment of the prior art, CPU 3 uses a cryptographically secure hash function, such as MD5, to create a message digest of the data 1 within file 5, and stores the resulting output hash value in file 5 as security value S. MD5 is described in Schneier, *Applied Cryptography, Second Edition* (John Wiley & Sons 1996), pp. 436–441, U.S.A. As with the first two prior art embodiments described above, security value S is not used by the hash function when the function is executed. As before, it is easy to recompute the security value S if the hacker knows that MD5 or another hash function is being used, and then to surreptitiously replace the security value S within file 5; and it is easy for the hacker to determine which function is being used.

McNamara, John E., *Technical Aspects of Data Communication*, 2nd Ed. 1982, Digital Equipment Corporation, U.S.A., pp. 110–122, describes a Cyclic Redundancy Check (CRC) function that is useful in the present invention.

Ore, Oystein, *Number Theory and Its History*, 1976, Gudrun Ore, U.S.A., pp. 124–129, discuss mathematical problems having two unknowns.

DISCLOSURE OF INVENTION

The present invention is a system and method for verifying the integrity of contents within a computer file (5). The method comprises the steps of storing a security value S within the file (5), applying a verification function f against the entire contents of the file (5) including S, where f is a function of S; comparing results R of the applying step against a preselected value r, where r is not stored within the file (5); and, when R equals r, determining that the file (5) has not been modified.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
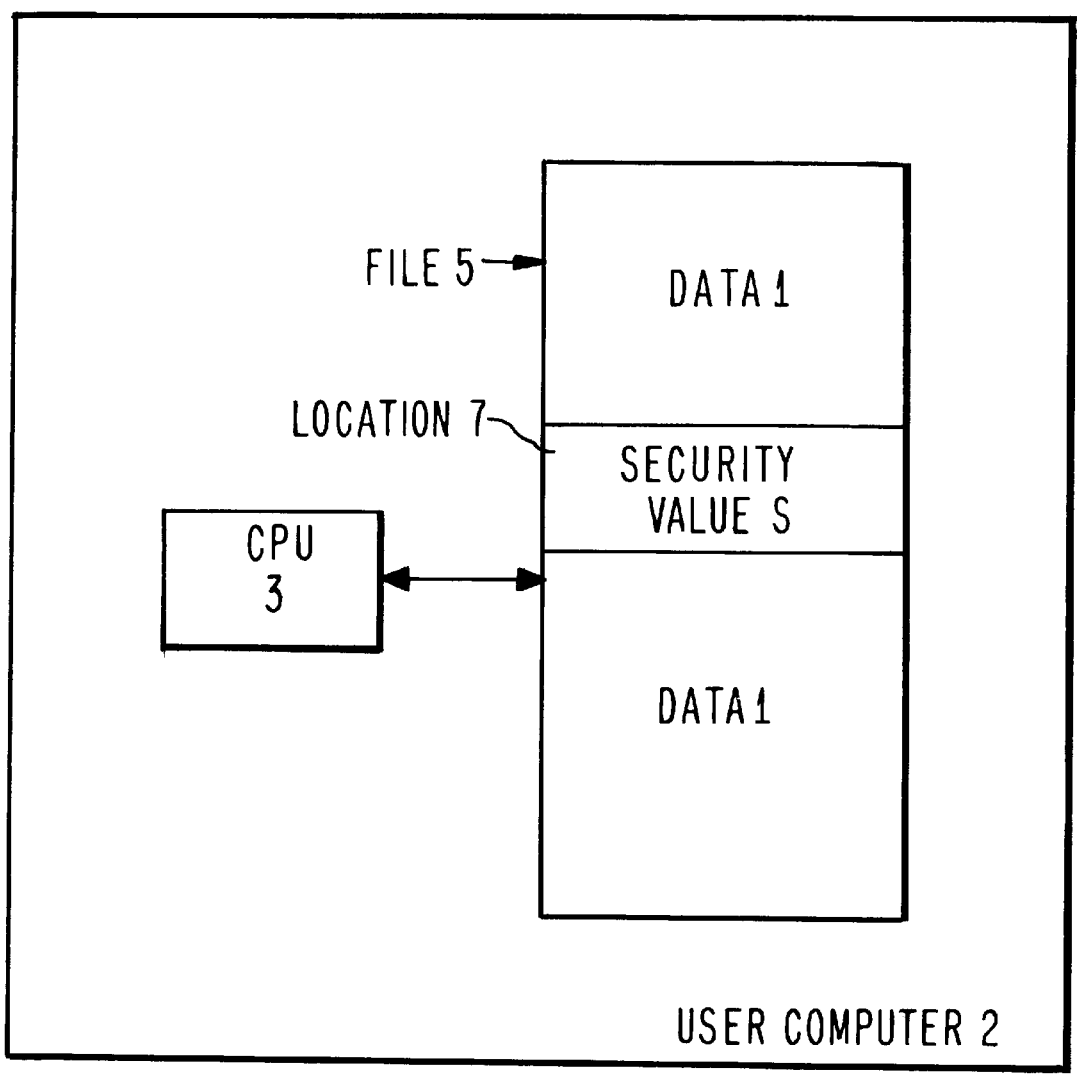
FIG. 1 is a block diagram illustrating prior art.

In this application, reference numeral 7 pertains to the location of the security value, while the letter S pertains to the numerical value of the security value. Similarly, reference numeral 13 pertains to the location of the residual value, while the letter r pertains to the numerical value of the residual value. As used in this application, "data" can be anything that is storable within a digital computer. Thus, data can include computer programs, information that the user wishes to store or manipulate, etc.

Figure 3:
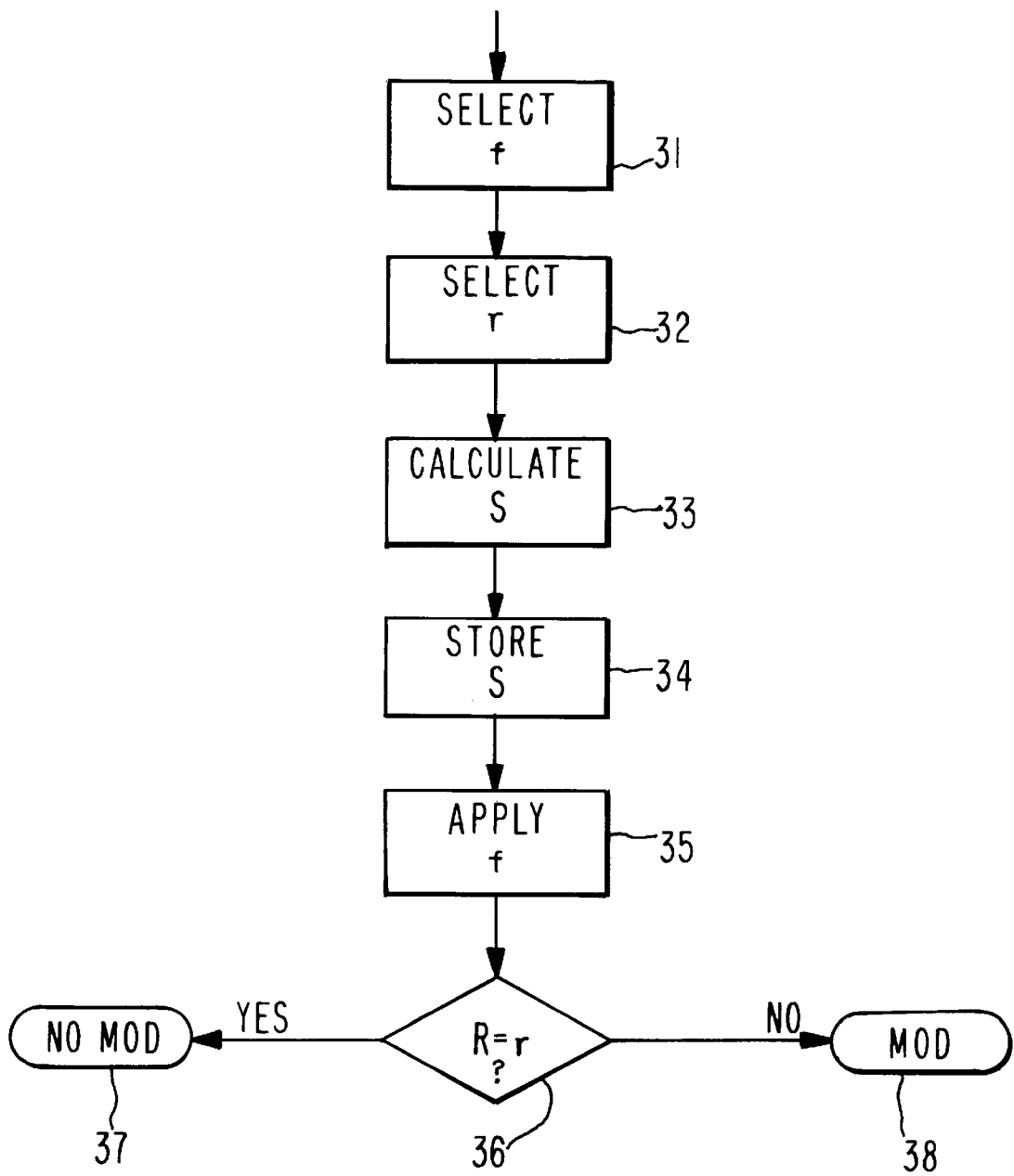
FIG. 3 is a flow chart illustrating the operation of the present invention.

The operation of the present invention can be understood by examining FIG. 3. At step 31, the file integrity verification function f is selected by the users of computers 2 and/or 4. In the present invention, the file verification function f can be any distributive invertible function. As used in this specification and claims, distributiveness pertains to additive distributiveness. Thus, a function f that is additive distributive is one that satisfies the equation:

$$f(N)+f(S)=f(N+S)$$

where N and S are any variables.

As used in this specification and claims, an invertible function $f(N,S)=r$ is a function where, given r and given N, one can calculate S. r is the residual value that results when f is applied to N and S.

An example of a distributive invertible function that is useful in the present invention is the Cyclic Redundancy Check (CRC) function that is described in *McNamara*, supra. This CRC function is the modulo p function, where p is somewhat loosely referred to as a "polynomial". The division by p is performed over a Galois field to expedite the calculations. The CRC function is an excellent choice for use in the present invention, because it is not obvious that it is an invertible function; and, even if one does realize that it is an invertible function, it is not obvious how to invert it.

These features enhance security, because they make it harder for hackers to determine the type of security being used.

For the CRC function generally, $(N+S2^n)\bmod(p)=R$. In this case, the residual value R is the remainder that is left over after the division by p. For the purposes of this invention, the quotient is irrelevant and is discarded.

For a CRC function generally, p is not normally a prime number, because it is desired to obtain a gratuitous parity check along with the calculation of modulo p. In the present invention, on the other hand, we do want p to be a prime number. p is selected to be one bit longer than the size of the security value S. The first and last bits of p must be a 1. The first bit of p must be a 1 so as to preserve the desired length of p. The last bit of p must be a 1 to guarantee that p really is a prime number. p can be any random prime number satisfying these criteria.

At step 32, the target (desired) residual value r obtained by applying f against the contents of file 5 is selected, and is stored at a location 13 that is accessible to CPU 3 but is not part of file 5. The value of r is typically selected to be zero. The size of location 13 is typically 64 bits.

Figure 2:
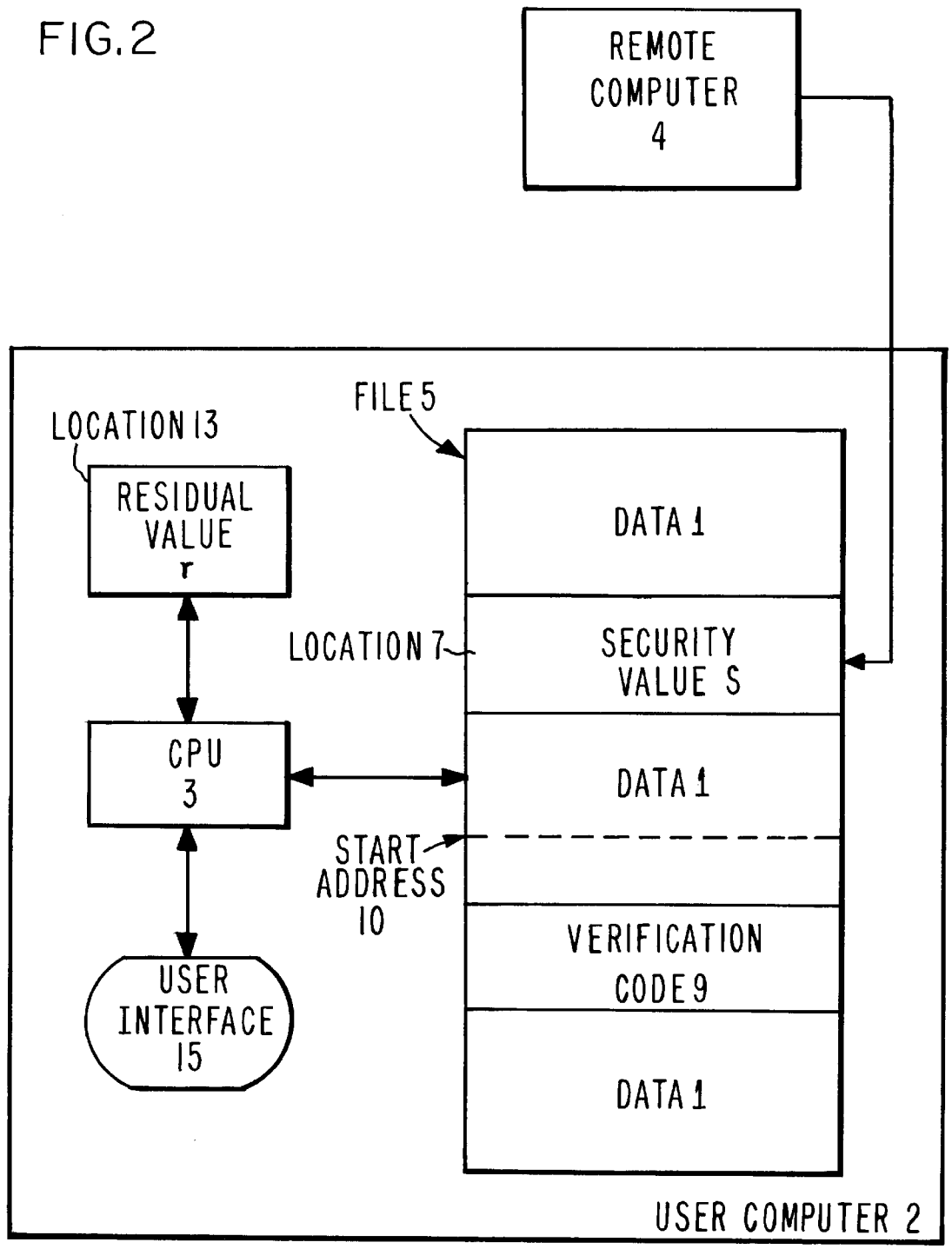
FIG. 2 is a block diagram illustrating the present invention.

In step 33, a check generating program calculates the value of security value S, where f is a function of S, based upon the entire contents of file 5. For security purposes, this calculation is performed by a computer 4 which is remote from user computer 2. In step 34, computer 4 stores S at a preselected location 7 within file 5. Location 7 should be embedded within file 5, and not at its beginning or end. At step 35, CPU 3 executes verification function f, applying it against the entire contents of file 5, including all data 1, the computer code 9 representing verification function f if said code is present within file 5, and the security value S itself (see FIG. 2). It is preferable for the preferred embodiment where f is a CRC function (and perhaps for other functions f) for CPU 3 to begin the processing at some start address 10 that is neither at the beginning nor the end of file 5. The processing thus proceeds in a downward direction from the dashed line in FIG. 2, wraps around the end of file 5, and ends just before where it started at start address 10. If the processing were to start at the beginning of file 5, it would be easier for a hacker to defeat the security. Start address 10 should not coincide with the beginning address or the ending address of location 7.

At step 36, the results R obtained by CPU 3 applying function f against file 5 are compared against the target residual value r. When these two numbers are equal, CPU 3 determines that the contents of file 5 have not been modified. This information can be conveyed in the form of a signal 37 that is sent to the user via user interface 15, which may be, for example, a monitor. If, on the other hand, R does not equal r, then CPU 3 determines that the contents of file 5 have been modified, maliciously or otherwise. This information can be signaled to the user by signal 38 over user interface 15. This determination step, like all of the other steps of the present invention, can be implemented in hardware, firmware, software, or any combination thereof.

If a hacker were to modify any of the contents of file 5, including data 1, security value S, and/or verification code 9, applying the verification function f against file 5 would result in R not equaling r. The user would be flagged by signal 38 that a modification had occurred and thus the contents of file 5 had been compromised.

The operation of the check generating function will now be described. This function is executed by computer 4. Computer 4 can be controlled, for example, by the vendor of a software package that is shipped and used by a number of user computers 2. The purpose of the check generating function is to calculate the security value S that is stored within file 5 of each user computer 2. The user is allowed to change the contents of his file 5 after security value S has been stored therewithin, but if he does so and wishes to maintain security, it is necessary for computer 4 to re-execute the check generating function, thus recalculating security value S, and then to re-store S within file 5.

The check generating function is the same function chosen to be verification function f. Since the preferred function for verification function f is the CRC function, a CRC function will be described herein. The result R of applying a CRC function is a remainder when dividing a sequence of bytes by another sequence of bytes, performing said division while treating the bytes as polynomials over a Galois field based on $2^m$, where m is the size of the CRC residual value R. The CRC value R depends sensitively on the entire contents of file 5, but it is a linear function and can be inverted, although not obviously. There are optimized methods of calculating CRC's that do not require actually doing long division in polynomial fields, thus making the implementation quicker. These optimized methods, which are described in the reference cited in endnote 7 of *McNamara*, supra, make it hard to determine that it is even a CRC that is taking place, thus making the lives of hackers more difficult.

The check generating program generates security value S as follows. The goal is to calculate that security value S that will cause the actual residual value R of applying verification function f against file 5 to equal the target residual value r. In the following mathematical description, N is the aggregated entire contents of file 5 treated as one very large number. This value is normalized, so that the first bytes checked by verification program f (i.e., those bytes commencing at start address 10) are the beginning of said very large number N. Thus, N reflects what the CRC function f is actually executing against, not the native order of file 5.

R is the residual value for file 5. S is the security value inserted at location 7 within file 5. n is the position of the security value S from the end of file 5, so that, treated as a number from the point of view of the CRC calculation, the security value is equal to $S2^n$. p is a number called the CRC polynomial that is used to generate the CRC residual value R. r is the target CRC residual value for file 5. As noted above, in the case of the CRC function, all arithmetic is done on polynomials in a Galois field based upon $2^m$. For Galois polynomial arithmetic, "+" and "−" are equivalent to each other and are equivalent to the "exclusive or" (XOR) operation.

The initial CRC residual value for file 5:

$R=N\bmod(p)$, by the definition of CRC.

The goal is that R equals r, which will normally require modifying S. We achieve this goal by noting that if we modify N by changing S, then we have:

$N_{new}=N+S2^n$ $R_{new}=N_{new}\bmod(P)$

Since mod is a linear function, we have:

$R_s=S2^n\bmod(p)$, where $R_s$ is the residue of S.

$R_{new}=(N\bmod(p)+S2^n\bmod(p))\bmod(p)=(R+R_s)\bmod(p)$

Since "+" is a XOR in this field, and R and $R_s$ are both smaller than p, being already both remainders, this expression reduces to:

$R_{new}=R+R_s$

The desired remainder $R_s$, is $R_s=r-R$ because we want $R_{new}$ to be equal to r.

Now we have, by the definition of $R_s$ as given above:

$S2^n\bmod(p)=r-R$, and we need to calculate S.

$R_s \bmod(p) = r - R$ implies that:

$pA + r - R = R_s$ for some integer A, so we have:

$pA + r - R = S2^n$

Rearranging while remembering that "+" and "−" are equivalent in Galois field $2^m$ arithmetic:

$pA + S2^n = r - R$

This is an equation in two unknowns S and A, requiring a solution for both S and A in integers (Diophantine equation). This can be solved using Euclid's extended algorithm (see Ore, supra). The only requirement for this to have a solution is that p be primitive (the equivalent of a prime number in a Galois field), which ensures that the algorithm does not lead to an indeterminate solution.

We need only S, and are uninterested in A. Computer 4 inserts S into location 7 in the original file 5, preferably by using an XOR operation in case the original contents at location 7 were not zero. We now have our desired result. The CRC residual value R of file 5 is the desired target value r.

The present invention offers the following advantages over the prior art:

- The file integrity check value (security value S) is not stored within file 5 in a direct way, but file 5 is still self-contained. By this is meant that all of the verification is done using file 5 itself.
- Reverse engineering the verification function f does not directly help with changing the security value S in the file 5 to subvert the integrity check when the file 5 is maliciously modified. This is because a hacker does not know where the security value S is within file 5, or how to change security value S to get the desired result.
- There is no computer code within file 5 that does the calculation of the needed security value S, because the calculation of the security value S is performed by computer 4 at a remote location.
- The verification of file 5 integrity can be done by a relatively simple CRC function.
- A hacker who wishes to maliciously modify data 1 within file 5 wishes for a safe modification of the verification program f. He wants to disable security safeguards of the program f without totally breaking the program f, because he does not want the user to know what is going on. In the present invention, there is no indication within the verification program f where the file 5 can be safely modified to alter the residual value R to insure that R continues to equal r.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for verifying the integrity of contents within a computer file, said method comprising the steps of:

storing a security value S within the file, where S depends upon a verification function f, said file contents, and a preselected residual value r, where r is not stored within the file;

applying f against the entire contents of the file including S, to obtain results R;

comparing R against r; and when R equals r, determining that the file has not been modified.

2. The method of claim 1, wherein f is a distributive invertible function.

3. The method of claim 2, wherein f is the cyclic redundancy check function known as modulo p, p being a "polynomial".

4. The method of claim 3, wherein p is a prime number.

5. The method of claim 4, wherein the length of p is one bit greater than the length of S.

6. The method of claim 1, wherein the value of r is zero.

7. The method of claim 1, wherein a computer remote from the file executes a check generating program; and the check generating program calculates S and stores S within a preselected location within the file.

8. The method of claim 7 where S is calculated to be that number that will force R to be equal to r.

9. The method of claim 7, wherein, subsequent to the final step of claim 7, a user changes the contents of the file; and the check generating program recalculates and restores S based upon the changed contents of the file, in order to preserve the integrity of the file.

10. Apparatus for safeguarding the integrity of contents within a computer file, said apparatus comprising:

a file associated with a first computer and containing data;

a second computer located remote from the file, said second computer adapted to calculate a security value S, where S is based upon all the contents of the file and also depends upon a verification function f and a preselected residual value r, and to store S within a preselected location within the file;

processing means for applying f against the entire contents of the file including S, to obtain results R; and means for comparing R against r, where r is not stored within the file; and means for determining that the file has not been modified, when R equals r.

11. A computer readable medium for storing a computer program that verifies the integrity of contents within a computer file by following the steps of:

storing a security value S within the file, where S depends upon a verification function f, said file contents, and a preselected residual value r, where r is not stored within the file;

applying f against entire contents of the file including S, to obtain results R;

comparing R against r; and when R equals r, determining that the file has not been modified.

* * * * *